United States Patent
Kim et al.

(10) Patent No.: US 9,899,693 B2
(45) Date of Patent: Feb. 20, 2018

(54) MICROSTRUCTURED CATHODE FOR SELF-REGULATED OXYGEN GENERATION AND CONSUMPTION

(71) Applicant: THE REGENTS OF THE UNIVERSITY OF CALIFORNIA, Oakland, CA (US)

(72) Inventors: Chang-Jin Kim, Beverly Hills, CA (US); Prosenjit Sen, Los Angeles, CA (US); Janet I. Hur, Los Angeles, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 874 days.

(21) Appl. No.: 14/370,440

(22) PCT Filed: Jan. 9, 2013

(86) PCT No.: PCT/US2013/020895
§ 371 (c)(1),
(2) Date: Jul. 2, 2014

(87) PCT Pub. No.: WO2013/106478
PCT Pub. Date: Jul. 18, 2013

(65) Prior Publication Data
US 2014/0342255 A1     Nov. 20, 2014

Related U.S. Application Data

(60) Provisional application No. 61/585,143, filed on Jan. 10, 2012.

(51) Int. Cl.
*H01M 8/0606*       (2016.01)
*H01M 8/04089*     (2016.01)
(Continued)

(52) U.S. Cl.
CPC ....... *H01M 8/0606* (2013.01); *H01M 4/8605* (2013.01); *H01M 4/8626* (2013.01);
(Continued)

(58) Field of Classification Search
CPC ........... H01M 8/0606; H01M 8/04201; H01M 8/04089; H01M 4/8605; H01M 4/8626
See application file for complete search history.

(56) References Cited

U.S. PATENT DOCUMENTS

| 4,615,955 A | 10/1986 | Amakawa et al. |
| 7,081,317 B2 | 7/2006 | Fujii et al. |

(Continued)

FOREIGN PATENT DOCUMENTS

KR     10-2006-0080385     7/2006

OTHER PUBLICATIONS

PCT International Preliminary Report on Patentability (Chapter I of the Patent Cooperation Treaty) for PCT/US2013/020895, Applicant: The Regents of the University of California, Form PCT/IB/326 and 373, dated Jul. 24, 2014 (7pages).
(Continued)

*Primary Examiner* — James Lee
(74) *Attorney, Agent, or Firm* — Vista IP Law Group LLP

(57) ABSTRACT

A fuel cell is disclosed with a self-regulated oxygen supply used in conjunction with a self-pumping fuel supply (e.g., a self-pumping anode). The cathode side of the fuel cell includes a gas diffusion electrode interposed between the fuel chamber and the oxidant chamber (e.g., $H_2O_2$), the gas diffusion electrode having a catalyst layer formed thereon. An oxygen gas capturing substrate is disposed in the oxidant chamber and is spaced apart from the gas diffusion electrode. The gas capturing substrate has first and second sides containing a plurality of holes extending there between. The first side of the substrate faces the oxidant and the second
(Continued)

side faces the gas diffusion electrode. The substrate contains a catalyst on the second side of the substrate or within an inner surface of the holes.

13 Claims, 9 Drawing Sheets

(51) Int. Cl.
  H01M 8/1009    (2016.01)
  H01M 4/86      (2006.01)
  H01M 8/04082   (2016.01)
(52) U.S. Cl.
  CPC ... *H01M 8/04089* (2013.01); *H01M 8/04201* (2013.01); *H01M 8/04216* (2013.01); *H01M 8/1009* (2013.01); *H01M 2250/00* (2013.01)

(56) References Cited

U.S. PATENT DOCUMENTS

| | | | |
|---|---|---|---|
| 2005/0008911 A1 | 1/2005 | Kaye | |
| 2006/0068271 A1 | 3/2006 | Ren et al. | |
| 2006/0099482 A1* | 5/2006 | Scott | H01M 4/8605 429/483 |
| 2008/0070083 A1* | 3/2008 | Markoski | H01M 8/04186 429/492 |
| 2008/0107949 A1 | 5/2008 | Yoshie et al. | |
| 2008/0118790 A1 | 5/2008 | Kim et al. | |
| 2012/0148931 A1 | 6/2012 | Kim et al. | |

OTHER PUBLICATIONS

PCT International Search Report for PCT/US2013/020895, Applicant: The Regents of the University of California, Form PCT/ISA/210 and 220, dated Jun. 11, 2013 (5pages).

PCT Written Opinion of the International Search Authority for PCT/US2013/020895, Applicant: The Regents of the University of California, Form PCT/ISA/237, dated Jun. 11, 2013 (5pages).

D. D. Meng and C.-J. Kim, "An active micro-direct methanol fuel cell with self-circulation of fuel and built-in removal of $CO_2$ bubbles", J. Power Sources, 194 (2009), pp. 445-450.

T. Shimizu, T. Momma, M. Mohamedi, T. Osaka, and S. Sarangapani, "Design and fabrication of pumpless small direct methanol fuel cells for portable applications," Journal of Power Sources, 2004, vol. 137, pp. 277-283.

J. Yeom, R. S. Jayashree, C. Rastogi, M. A. Shannon, and P. J. A. Kenis, "Passive direct formic acid microfabricated fuel cells," Journal of Power Sources, 2006, pp. 1058-1064 (in press).

E. R. Choban, L. J. Markoski, A. Wieckowski, and P. J. A. Kenis, "Microfluidic fuel cell based on laminar flow", Journal of Power Sources, 128 (2004) pp. 54-60.

R. S. Jayashree, L. Gancs, E. R. Choban, A. Primak, D. Natarajan, L. J. Markoski, P. J. A. Kenis, "Air-breathing laminar flow-based microfluidic fuel cell", Journal of the American Chemical Society, 127 (2005), pp. 16758-16759.

D. D. Meng and C.-J. Kim, "A methanol-tolerant gas-venting microchannel for a microdirect methanol fuel cell," J. MEMS, vol. 16, pp. 1403-1410, 2007.

J. I. Hur, D. D. Meng, and C.-J. Kim, "Membranelss micro fuel cell chip enabled by self-pumping of fuel-oxidant mixture," IEEE International Conference on Micro Electro Mechanical Systems, pp. 168-171, Jan. 2010.

J. G. Liu, T. S. Zhao, R. Chen, and C.W. Wong, "The effect of methanol concentration on the performance of a passive DMFC," Electrochem. Commun., vol. 7, pp. 288-294, 2005.

J. L. Cohen, D. J. Volpe, D. A. Westly, A. Pechenik, and H. D. Abruna, "A dual electrolyte H2/O2 Planar membraneless microchannel fuel cell system with open circuit potentials in excess of 1.4 V," Langmuir, vol. 21, pp. 3544-3550, 2005.

C. Y. Chen and P. Yang, "Performance of an air-breathing direct methanol fuel cell," J. Power Sources, vol. 123, pp. 37-42, 2003.

S. Ha, B. Adams, and R. I. Masel, "A miniature air breathing direct formic acid fuel cell," J. Power Sources, vol. 128, pp. 119-124, 2004.

E. Kjeang, B. T. Proctor, A. G. Brolo, D. A. Harrington, N. Djilali, and D. Sinton, "High-performance microfluidic vanadium redox fuel cell," Electrochimica Acta, vol. 52, pp. 4942-4946, 2007.

S. Hasegawa, K. Shimotani, K. Kishi, and H. Watanabe, "Electricity generation from decomposition of hydrogen peroxide," Electrochem. Solid-State Lett., vol. 8, pp. A119-A121, 2005.

E. Kjeang, A. G. Brolo, D. A. Harrington, N. Djilali, and D. Sinton, "Hydrogen peroxide as an oxidant for microfluidic fuel cells," J. Electochem. Soc., vol. 154, pp. B1220-B1226, 2007.

* cited by examiner

MICROSTRUCTURED CATHODE FOR SELF-REGULATED OXYGEN GENERATION AND CONSUMPTION

RELATED APPLICATION

This Application is a U.S. National Stage filing under 35 U.S.C. § 371 of International Application No. PCT/US2013/020895, filed Jan. 9, 2013, which claims priority to U.S. Provisional Patent Application No. 61/585,143, filed on Jan. 10, 2012. Priority to the aforementioned applications is hereby expressly claimed in accordance with 35 U.S.C. §§119, 120, 365 and 371 and any other applicable statutes.

STATEMENT REGARDING FEDERALLY SPONSORED RESEARCH OR DEVELOPMENT

This invention was made with Government support under Grant No. 0824269, awarded by the National Science Foundation. The Government has certain rights in the invention.

TECHNICAL FIELD

The technical field generally relates to cathodes and more particularly cathodes usable within fuel cells.

BACKGROUND

Fuel cells are an attractive mechanism to generate electricity. One particular benefit of fuel cells over other energy sources is that they are more environment-friendly than batteries or combustion-based devices. Fuel cells have been successfully utilized that have relatively large sizes (e.g., dimensioned with a scale above centimeters). Fuel cells have a strong potential for use in smaller scales as well, because of their simple construction compared with internal combustion engines and the high energy density of their fuels compared with batteries. Unfortunately, miniaturization below the centimeter-scale has been unsuccessful mainly because one could not miniaturize the ancillary parts (e.g., pumps, valves, etc.) needed to operate the fuel cell and package them into a small space without taking up the volume needed for fuel.

Recent attempts have been made to pump fuels with no ancillary parts, opening the door for fuel cells in millimeter scales. For example, self-pumping fuel cells have developed that embed the ability to pump liquid fuel and remove generated gas bubbles using the anode side of the device. U.S. Patent Application Publication No. 2008-0118790, for instance, discloses a device for pumping liquids using directional growth and elimination of bubbles. Without any discrete pump, the fuel can nevertheless be actively pumped and circulated, maintaining the fuel concentration. In contrast, passive fuel cells rely on fuel diffusion to the electrode, with the inevitable tendency to develop a depletion zone over time.

In order to eliminate the ancillary part for oxidant supply, attempts have been made to flow an oxygen-saturated oxidant inside the channel or integrate an air-breathing cathode to supply oxygen from ambient air. However, the mass-transport-rate-limited process to the cathodic site predominantly controlled the current density of those fuel cells. The fuel cells based on dissolved oxygen were particularly limited by the low solubility of oxygen. Air-breathing designs need a stream of electrolyte on the cathode that blocks fuel from crossing over and conducting ions through between the electrodes. These designs are also inherently dependent on the free convection of oxygen from ambient air to the cathode. Therefore, the system will lose its flexibility in choosing operating environments, and scaled-up applications will face difficulties, where most likely the fuel cells will need to be stacked on top of each other. The requirement to have ample air convection makes it very problematic to stack fuel cells into larger systems.

Thus, while progress has been made on the fuel side (i.e., anode) of a fuel cell for active pumping without the need for ancillary components, the oxidant side (i.e., cathode) still requires cumbersome construction and ancillary parts for the active supply of oxidants unless there is access to ambient air. Even if the system is designed to have access to ambient air, the performance may suffer if the oxidant supply is hindered (e.g., limited access to air due to flooding or the like). There is a need for a fuel cell that can be made with no moving parts and is able to scale-down to sub-centimeter dimensions.

SUMMARY

In one embodiment, a fuel cell is provided that includes both an anode and cathode that are disposed in a housing containing a fuel chamber and an oxidant chamber. The oxidant chamber includes a microstructured substrate, which generates and captures oxygen bubbles. The captured oxygen is consumed as needed based on fuel cell load, and oxygen generation is stopped when the oxygen is not consumed. The microstructured cathode thus self-regulates the supply of oxidant. This is accomplished without the need of any ancillary parts such as oxygen tanks and eliminates the need for air-breathing cathodes to face the ambient air to ensure ample air convection. An advantage of the resulting fuel cell is that is a monolithic standalone system with a single component.

In another embodiment, a self-regulated gas generator includes a substrate containing a plurality of wells or holes contained therein, each well or hole containing one or more inner surfaces. A catalyst layer is formed on the one or more inner surfaces of the plurality of wells or holes. A gas generating source in the liquid phase is disposed over the wells or holes. The gas generating source in the liquid phase contacts the catalyst and forms a gaseous product which forms a bubble within the well or hole. When the bubble displaces the liquid phase from the catalyst layer gas generation will stop. Consumption of the gas of the bubble will cause the same to shrink, thereby exposing the catalyst to the liquid phase to again produce the gas forming the bubble.

In another embodiment, a self-regulated gas generator includes a substrate containing first and second surfaces and a patterned layer of catalyst formed on one of the first and second surfaces, wherein the patterned layer comprises a plurality of discrete spots of catalyst. A gas generating source in the liquid phase is disposed over the patterned layer. In this alternative embodiment, there are no wells or holes per se. The gas bubbles form on the discrete spots where the catalyst is located.

In another embodiment, a fuel cell is disclosed that includes a housing containing a fuel chamber and an oxidant chamber. An anode is disposed in the housing and exposed to fuel chamber. A gas capturing substrate is provided in the housing and has a first side exposed to the oxidant chamber and a second side operatively connected to a gas diffusion electrode having a catalyst layer formed thereon and exposed to the fuel chamber, wherein the gas capturing substrate contains a plurality of holes contained therein, each hole containing an inner surface. A catalyst layer is formed on the inner surface of the plurality of holes.

In another embodiment, a fuel cell includes a housing containing a fuel chamber and an oxidant chamber. An anode is disposed in the housing and exposed to the fuel chamber. A cathode of the fuel cell includes a gas diffusion electrode interposed between the fuel chamber and the oxidant chamber, the gas diffusion electrode having a catalyst layer formed thereon and exposed to the fuel chamber. A gas capturing substrate is disposed in the oxidant chamber and spaced apart from the gas diffusion electrode, the gas capturing substrate having first and second sides containing a plurality of holes extending between the first and second sides, the first side facing an oxidant contained in the oxidant chamber and the second side facing the gas diffusion electrode, the gas capturing substrate containing a catalyst on at least one of the second side of the substrate or an inner surface of the plurality of holes.

In another embodiment, a fuel cell includes a housing containing at least one fuel chamber and at least one oxidant chamber. A fuel source is disposed in the fuel chamber. The oxidant chamber includes a gas capturing substrate disposed in the housing and having a first side facing an oxidant and a second side secured directly or indirectly to a gas diffusion electrode having a catalyst layer formed thereon and exposed to t le fuel source of the at least one fuel chamber, wherein the gas capturing substrate contains a plurality of holes or wells contained therein. A catalyst layer is formed within or adjacent to the plurality of holes or wells.

DETAILED DESCRIPTION OF THE ILLUSTRATED EMBODIMENTS

Figure 1A:
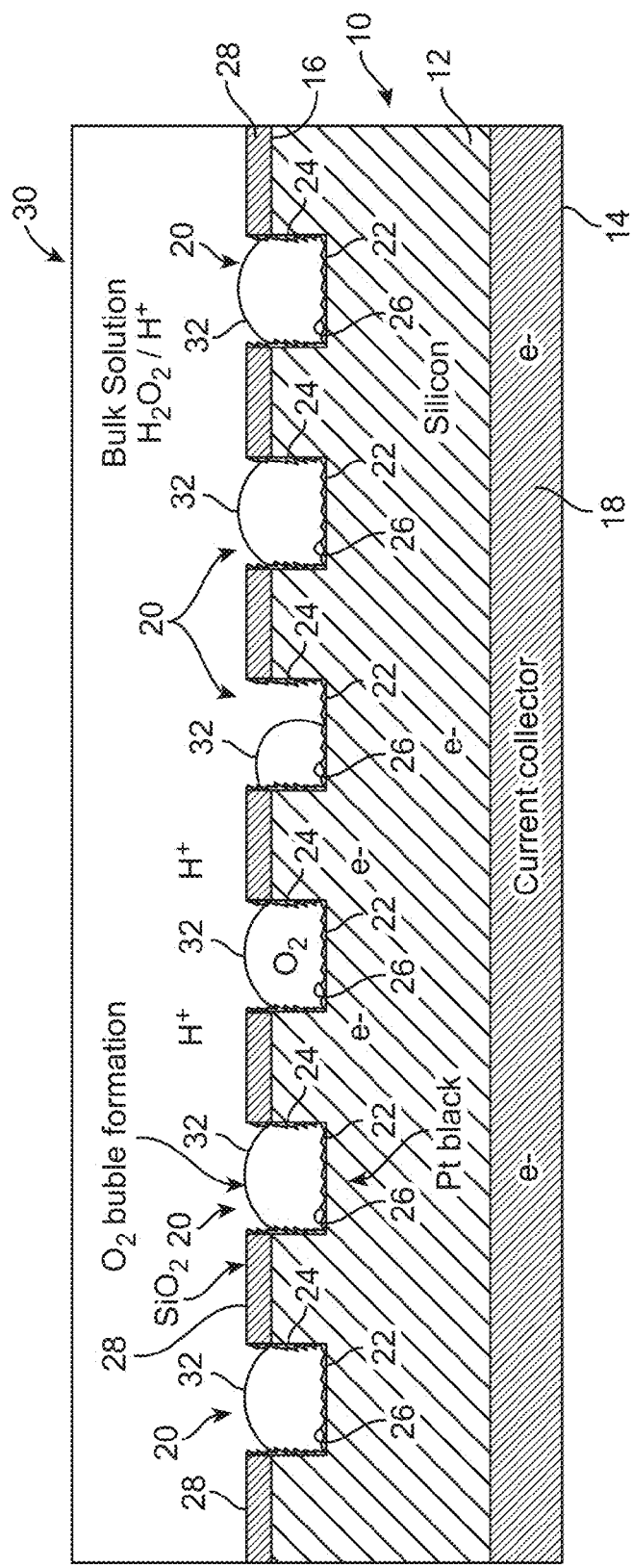
FIG. 1A illustrates a schematic representation of a self-regulated, gas generating substrate according to one aspect of the invention.
Figure 1B:
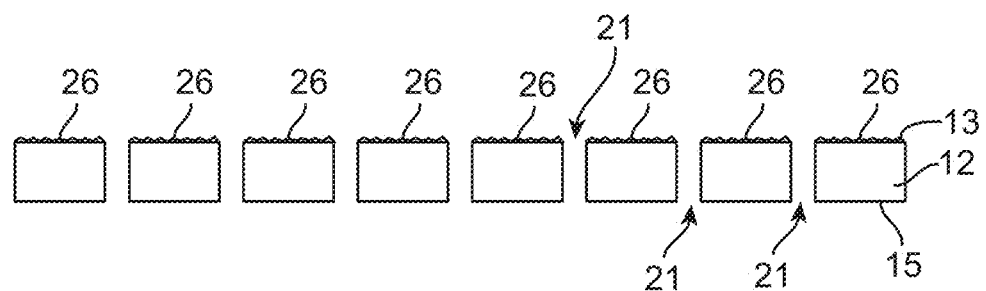
FIG. 1B illustrates a schematic representation of a self-regulated gas generating substrate according to another aspect of the invention.
Figure 8A:
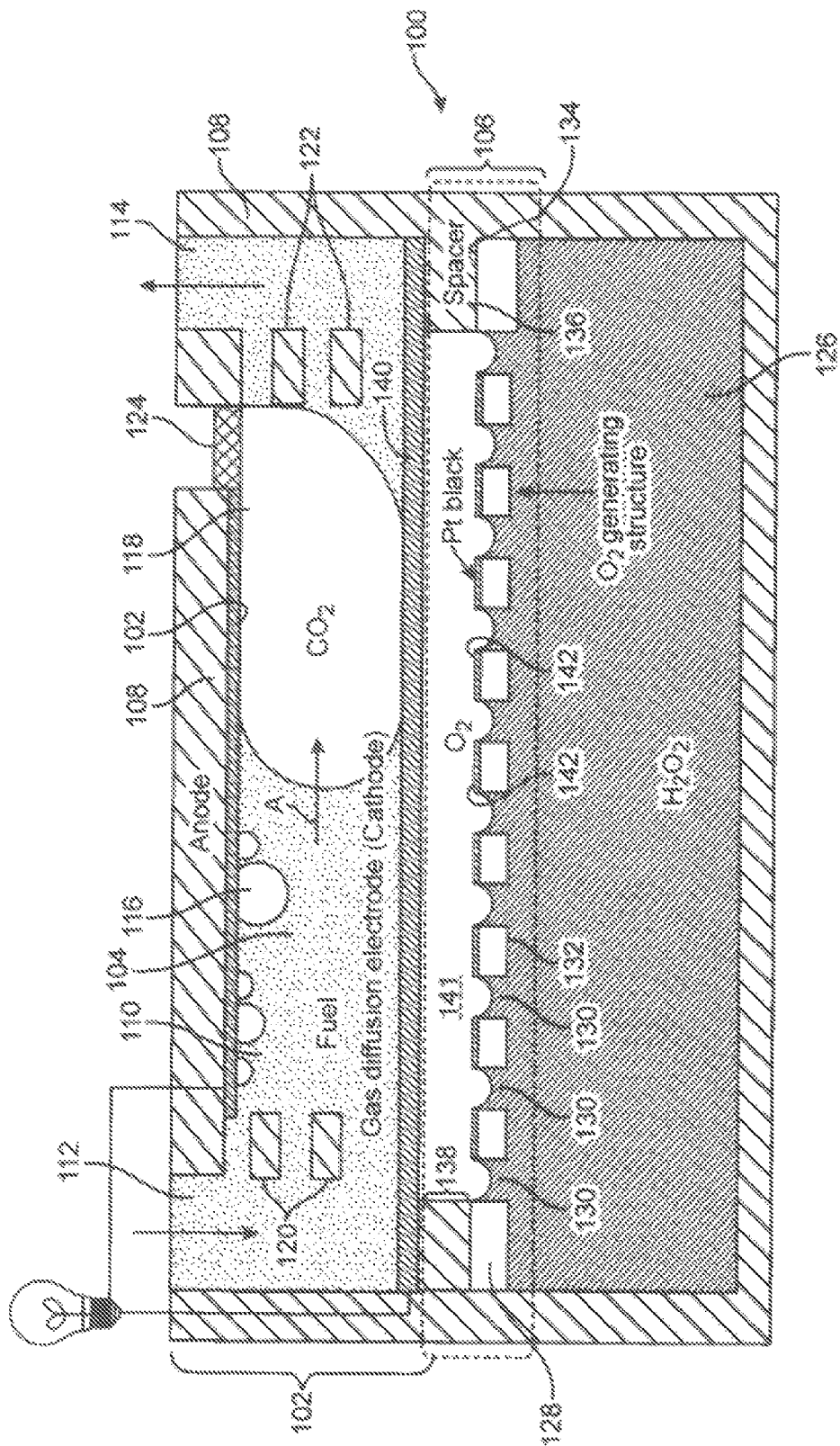
FIG. 8A illustrates a standalone fuel cell according to another embodiment.

FIG. 1A illustrates a self-regulated gas generator 10 according to one embodiment. The self-regulated gas generator 10 is formed in a substrate 12 such as silicon. The self-regulated gas generator 10 may, in some embodiments as described herein, may be used as a self-regulated cathode 10. The self regulated gas generator 10 is described herein as a self-regulated cathode 10 given that a main utilization of this structure is as part of a cathode structure. It should be understood, however, that the self-regulated gas generator 10 may also be used in other non-cathode applications. Nevertheless, reference numeral 10 will also be used to refer a self-regulated cathode 10. The self-regulated cathode 10 is constructed by micro-fabricating the same in a monolithic manner. FIG. 1A, for example, illustrates a silicon substrate 12 that is highly doped (e.g., 0.0015 Ω·cm). The substrate 12 has opposing sides 14, 16. A first side 14 of the substrate 12 is used a current collector 18 as illustrated in FIG. 1. The second side 16 of the substrate 12 contains a plurality of wells 20 contained therein. Each well 20 contains a bottom surface 22 and a side surface 24. In the embodiment of FIG. 1A, a layer of catalyst 26 (e.g., platinum black) coats the bottom surface 22 and/or the side surface 24. In this regard, one of the inner surfaces of the well 20 (e.g., surface 22, surface 24 or both) is coated with a catalyst 26. In other embodiments, where holes are created through the entirety of the substrate 12, the layer of catalyst 26 may not be located within the hole or bore per se but may instead be located adjacent to the hole or bore on the second side 134 of the substrate 128 as illustrated in FIG. 8A. FIG. 1B illustrates such an embodiment wherein through holes 21 are formed within a substrate 12 having first and second opposing sides, respectively 13, 15. The through holes 21 extend from one side 13 to the other side 15. On at least one side of the substrate (shown as side 13 in FIG. 1B) or an inner surface of the holes, a catalyst 26 is formed thereon.

Referring to FIGS. 1A and 1B, the wells 20 or holes 21 may be arrayed in the substrate 12 in a random or periodic fashion. For example, the wells 20 or holes 21 may be patterned as an array of repeating fashion. The wells 20 or holes 21 may be formed with a circular cross-sectional profile, creating cylindrically-shaped wells 20 or holes 21 within the substrate 12 although other shapes may be used as well.

Referring back to FIG. 1A, the second side 16 of the substrate 12 where the wells 20 are not located is illustrated with a $SiO_2$ layer 28. FIG. 1A illustrates the self-regulated cathode 10 in the presence of a liquid solution 30 containing an oxidant such as hydrogen peroxide ($H_2O_2$) and a source of hydrogen ions ($H^+$). The source of hydrogen ions ($H^+$) may include, for example, an acid. When the $H_2O_2$ in the solution 30 contacts the catalyst 26 inside the wells 20, oxygen ($O_2$) bubbles 32 instantly grow to fill up the wells 20. As the bubbles 32 grow within the wells 20, progressively more and more of the solution 30 containing the $H_2O_2$ is displaced away from the catalyst 26. Once the bubbles 32 completely displace the solution 30 from the catalyst 26, there is no physical contact between the two and the bubbles 32 cease to grow (i.e., $O_2$ generation stops). In this regard, $O_2$ generation is self-regulated by the wells 20 contained in the substrate 12. While the above embodiment has been described in the context of gas $O_2$ generation from liquid $H_2O_2$, it should be understood that other gas generating agents in the liquid phase may be used that generator or otherwise react with the catalyst 26 to form a gas.

When the self-regulated cathode 10 is incorporated as part of a fuel cell with an anode, the $O_2$ that is generated decomposes to water ($H_2O$). In this reaction, hydrogen ions (H+) combine with the $O_2$ gas and electrons produced by fuel oxidation to form water at the self-regulated cathode 10. As this reaction takes place and $O_2$ gas is consumed, the bubbles 32 shrink in size, thereby exposing the catalyst 26 to the $H_2O_2$ contained in the solution 30. Thus, loading of a fuel cell containing the self-regulated cathode 10 generates the $O_2$ gas on an as needed basis. The means for consuming the generated $O_2$ gas is thus a chemical reaction as part of the fuel cell. Of course, other chemical reactions or processes that consume or utilize gas apart from fuel cells may also be used. The bubbles 32 of $O_2$ gas do not freely liberate themselves from the wells 20 in which they are grown, Instead bubble growth acts as a self-regulating switch to stop bubble production once the growing bubble 32 has displaced enough solution 30 from the wells 20.

Figure 1C:
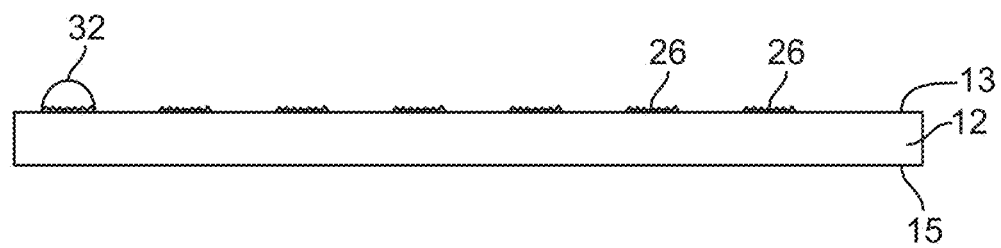
FIG. 1C illustrates a schematic representation of a self-regulate gas generating substrate according to another aspect of the invention.

FIG. 1C illustrates another embodiment of a substrate 12 that is used as part of a gas generator. In this embodiment, there are no wells 20 or holes 21 in the substrate 12. Rather, the catalyst 26 is patterned on a surface 13, 15 of a substrate 12 as a plurality of discrete spots. The patterned catalyst 26 effectively forms a surface with infinitely shallow wells on which bubbles 32 are formed. FIG. 1C illustrates one such bubble 32 that forms over the catalyst 26 spot that is formed on the substrate 12. Gas generation (or bubble growth) stops once the particular spot of catalyst 26 is no longer in contact with a surrounding liquid gas-generating agent.

Figure 2:
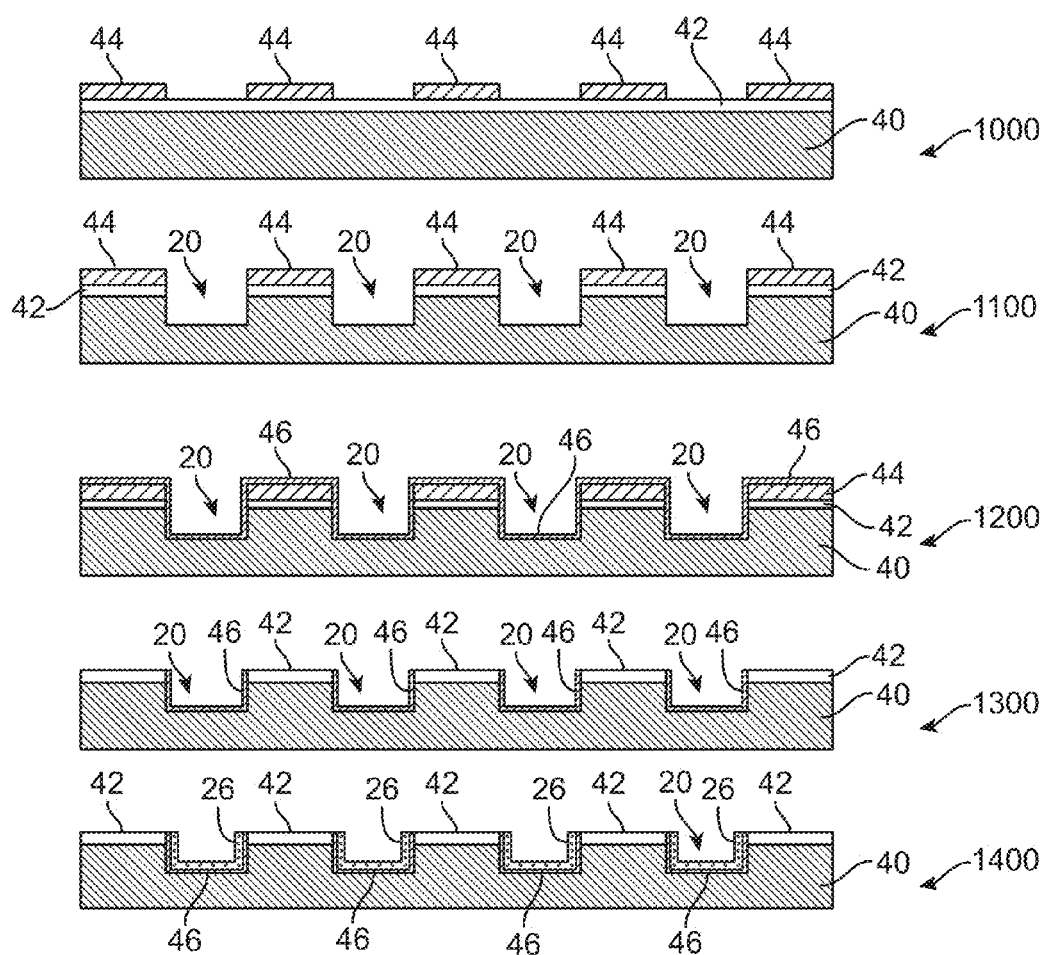
FIG. 2 illustrates an illustrative method of forming a self-regulated gas generator.

FIG. 2 illustrates an exemplary process of fabricating the self-regulated cathode 10 of FIG. 1A. In step 1000, a silicon wafer 40 (highly doped silicon wafer 0.0015 Ω·cm) is coated with a layer 42 of $SiO_2$. The coated wafer 40 is then is deposited with photoresist 44 and patterned. A thick photoresist (AZ 4620) can be used. As seen in step 1100 the exposed silicon dioxide and underlying silicon are etched using deep reactive ion etching (DRIE). The DRIE process forms an array of wells 20 having a diameter of 100 µm and a depth of 50 µm. Of course, other dimensions of the wells 20 are contemplated. Generally, the wells 20 have a diameter that is less than about 500 µm and a depth of less than about 100 µm to keep the bubbles within the wells. After the DRIE process, the polymer deposited inside the structures was removed by 1 minute of oxygen plasma etching. In operation 1200, a conformal seed layer of gold 46 is then deposited over the structure through using a planetary carousel in an e-beam evaporator to cover both sidewall and bottom surfaces inside the wells 20.

Next, as seen in operation 1300, a lift-off process exposes the oxide passivation layer. The use of the thick PR has furthermore served as a lift-off resist after evaporation of gold. In operation 1400, platinum black 26 is then plated onto the gold surface inside each well 20 using 1.0% w/w chloroplatinic acid and 6.0% w/w ammnonium phosphate. Vacuuming the structure prior to electroplating may be needed to remove trapped air. Loading of 2 mg/cm² was targeted at −0.5 V vs. Ag/AgCl using a potentiostat (Princeton Applied Research 263A). Prior to electroplating; the platinum black 26 catalyst, the wells 20 were first wetted with methanol to ensure that the plating solution is in contact with the gold seed layer and Pt plating is uniform throughout the sample.

Figure 3A:
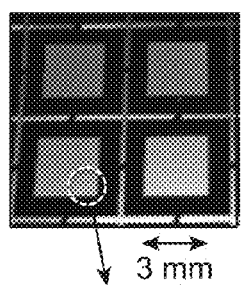
FIG. 3A is a photographic image of a fabricated, self-regulated gas generator.
Figure 3C:
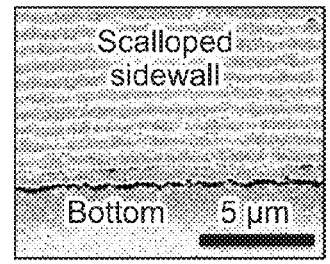
FIG. 3C illustrates a SEM image of deposited Pt black as a catalyst on scalloped deep reactive-ion-etched (DRIE) sidewall and bottom surfaces of a well.
Figure 3B:
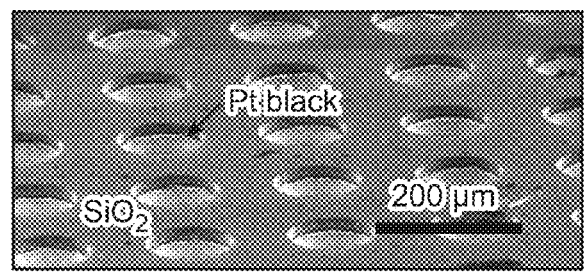
FIG. 3B illustrates a SEM image of the self-regulated gas generator.

A fabricated self-regulating cathode 10 was produced using the process outlined above having a dimension of 3 mm×3 mm as is illustrated in FIG. 3A showing four (4) chips of the cathode. The active platinum black 26 catalyst deposited surface area including the sidewall 24 and bottom 22 was 0.078 cm². A close view of the wells 20 by scanning electron microscopy (SEM), as seen in FIG. 3B, shows selective deposition of catalyst inside the wells 20 and as well as the silicon dioxide passivation layer to prevent oxygen formation outside of micro-pockets. SEM images confirmed the successful deposition of 500 nm platinum black 26 on both the scalloped sidewall 24 and bottom surface 22 as seen in FIG. 3C.

Figure 4:
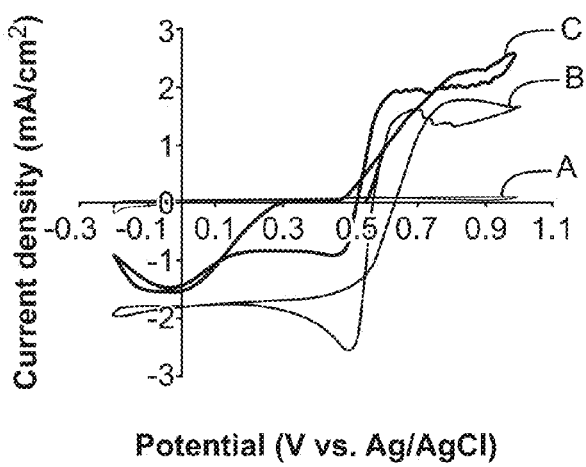
FIG. 4 illustrates a cyclic voltammetry graph of the self-regulated $O_2$ generator as a cathode after the addition of various solutions.

The electrochemical properties of the self-regulated cathode 10 were assessed using cyclic voltammetry as shown in FIG. 4. Sweeping in a blank solution of electrolyte alone shows a cyclic voltammetry pattern that is distinctive to a platinum electrode in contact with aqueous $H_2SO_4$. Upon addition of $H_2O_2$ into the solution, however, the open circuit potential (OCP) increases to 0.6 V vs. Ag/AgCl and starts showing reduction current below 0.5 V. A similar trend is maintained after HCOOH is added to simulate fuel crossover, although it is slightly shifted to the positive side, implying that some fuel is being oxidized and giving a mixed potential. However, even in a mixed-reactant condition the fabricated self-regulated cathode 10 can still maintain its ability to give reduction current and function as a cathode.

Figure 5:
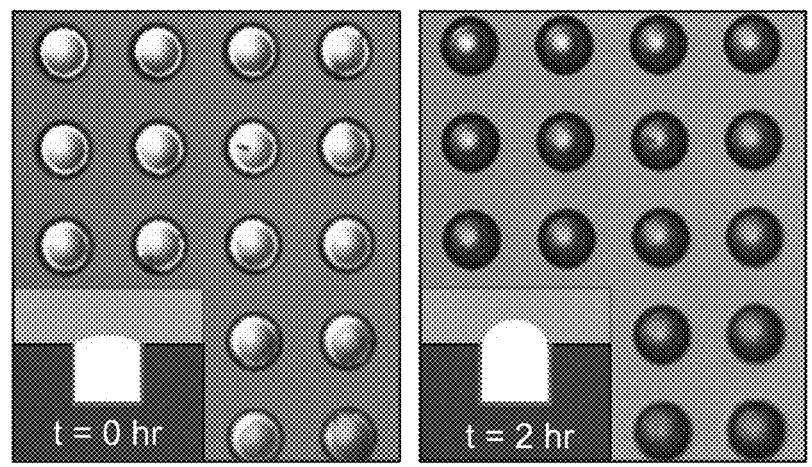
FIG. 5 illustrates photographic images of the formation of $O_2$ bubbles selectively within the wells at time t=0 hours and t=2 hours.

In another experiment to investigate the behavior of the bubbles 32, the self-regulating cathode 10 was exposed to a bulk solution of 1 M $H_2SO_4$ containing 0.1 M $H_2O_2$. The wells 20 were instantly filled with oxygen supply front hydrogen peroxide decomposition on contact with the catalyst. It was found that the formation of bubbles 32 is selective and bubbles 32 form only inside the wells 20 and not on the silicon dioxide passivation surface. The wells 20 successfully contained the oxygen bubbles 32 for over two (2) hours, blocking further decomposition of hydrogen peroxide while not under fuel-cell operation. FIG. 5 illustrates the formation of $O_2$ bubbles selectively within the wells 20 at time t=0 hours and t=2 hours. Even after 2 hours, oxygen bubbles, which grew in volume, are well contained within the wells 20.

Although the bubbles 32 grew in volume, the generation rate is not rigorous enough to let the oxygen bubble 32 leave the well 20, therefore the generated oxygen is not wasted down the stream, a problem from which other $H_2O_2$-utilizing microfluidic fuel cells suffer. Furthermore, the slow growth of oxygen bubbles 32 indicates that the catalyst and bulk solution are not completely separated from each other, so that when in fuel-cell operation mode protons from the bulk can conduct to the catalyst to some extent to complete the oxygen reduction.

Figure 6:
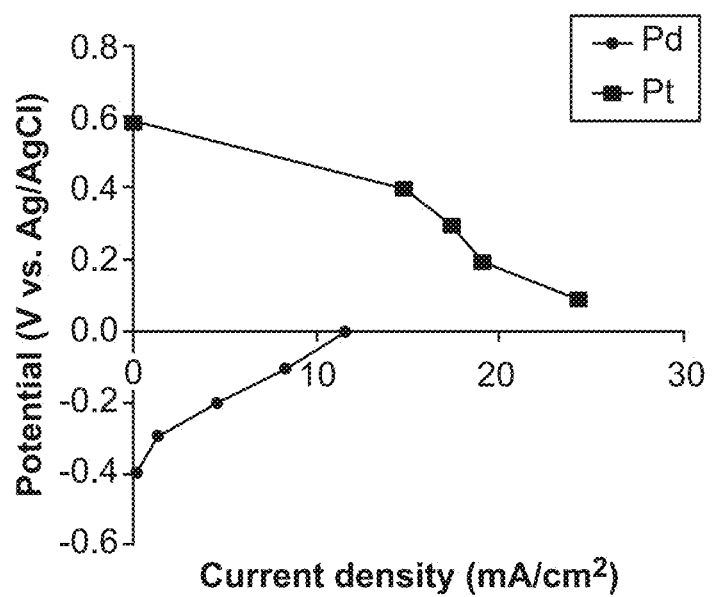
FIG. 6 illustrates a graph of potential as a function of current density for a half-cell tested self-regulated cathode and self-pumping anode, separately (Pd: anode, Pt: cathode).

It was also confirmed that the generated oxygen bubbles 32 are consumed during fuel-cell operation. Under potentiostatic half-cell operation of the self-regulated cathode 10, applying 0-0.3 V vs. Ag/AgCl resulted in a reduction in size of the bubbles 32, showing that the self-regulated cathode 10 makes use of the naturally decomposed oxygen bubbles 32. As soon as the circuit is open, i.e., the load is removed, the wells 20 are instantly refilled with oxygen bubbles 32 and further decomposition of oxygen and waste is prevented in a self-regulated manner. Half-cell tests of anode (Pd-deposited on graphite in 1 M HCOOH in 1 M $H_2SO_4$) and cathode, carried out individually, show reasonable current outputs as seen in FIG. 6, suggesting that the self-regulated cathode 10 can indeed function as a fuel cell when combined into one device. The OCP of the full fuel cell is ~1 V with no need for oxygen supply from a pressurized tank or ambient air.

The normalized current density suggests that the cathode and oxygen supply is not a limiting factor any more.

Figure 7:
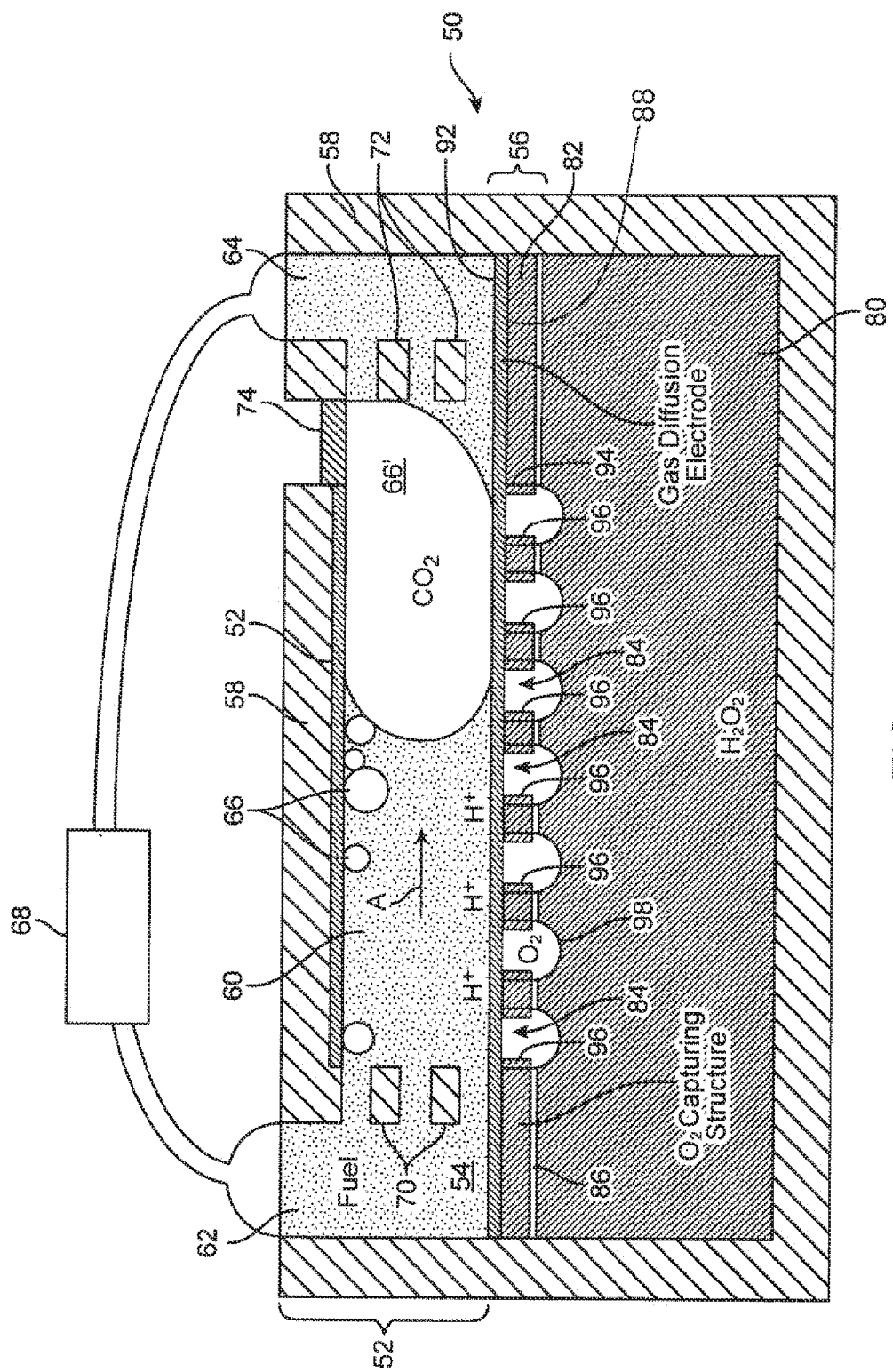
FIG. 7 illustrates a standalone fuel cell according to one embodiment.

FIG. 7 illustrates a standalone fuel cell 50 according to one embodiment. The fuel cell 50 of FIG. 7 is a standalone device that includes no ancillary or moving parts. The fuel cell 50 includes a self-pumping anode 52 that serves to self-circulate the fuel 54 within the fuel cell 50. The fuel cell 50 also includes self-regulating cathode 56 that supplies an as-needed supply of oxygen for the fuel cell 50. Together, the self-pumping anode 52 and the self-regulating cathode 56 are integrated in a device having a small footprint. The fuel cell 50 can be made in a stackable configuration and does not require complicated designs that are required when access to ambient oxygen is needed to power the fuel cell.

As seen in FIG. 7, the fuel cell 50 includes a housing 58. The housing 58 encloses the components of the fuel cell 50 including self-pumping anode 52, the self-regulating cathode 56, and the fuel reservoir 68. The housing 58 may be made of a polymer such as polycarbonate or the like. The self-pumping anode 52 includes a chamber 60 or channel where reaction takes place using the fuel 54 (e.g., reaction chamber). The fuel 54 used for the fuel cell 50 may include methanol or formic acid. Typically, the fuel 54 is combined with an electrolyte such as an acid like sulfuric acid ($H_2O_4$). For example, the fuel 54 may include 1M formic acid in 1M $H_2O_4$. The chamber 60 of the fuel cell 50 includes an inlet 62 and an outlet 64. During the self-pumping process, fuel 54 enters the chamber 60 and is pumped in direction of arrow A using the self-generated bubbles 66 as explained in more detail below. Fuel leaves the chamber 60 via the outlet 64. In one aspect of the fuel cell 50, the inlet 62 is coupled to a larger reservoir 68 that holds a larger volume of fuel 54. The outlet 64 is also coupled the reservoir 68, thus making a recirculating system. In an alternative embodiment, however, only the inlet 62 is coupled the reservoir 68 and the outlet 64 is directed to a waste chamber (not shown).

The chamber 60 is defined by the housing 58 and includes an anode 52 that is secured to one portion of the housing 58. The anode 52 is a graphite-based electrode (e.g., graphite plate) that is coated with palladium (Pd) black. The Pd acts as a catalyst for the anode 52. Formic acid is used as the fuel 54 in a dilute solution of sulfuric acid. Diluted sulfuric acid is used as an electrolyte for proton conduction through the liquid inside the chamber 60. At the same time, it serves as the medium for oxygen to diffuse from the through holes or wells formed in a substrate 82 into the vicinity of a gas diffusion electrode 92 containing the cathode catalyst. The mixed solution of fuel 54 and electrolyte starts a chemical reaction with the anode 52 whereby bubbles 66 of carbon dioxide ($CO_2$) are formed inside the chamber 60. As the bubbles 66 grow, they merge into a single large bubble 66' as seen in FIG. 7. Further growth of the bubble 66 is blocked by a check valve 70 near the inlet 62 forcing the bubble to propagate to in the direction of arrow A. Another check valve 72 is located downstream near to the outlet 64 to prevent gas from leaving via the outlet 64. This process pushes the used fuel stream in the direction of arrow A and out the outlet 64. A vent 74 is located in the housing 58 and is used to vent generated $CO_2$ out of the fuel cell 50. The vent 74 is a membrane that is porous to gas (e.g., PTFE membrane). As the bubble 66' grows large enough to reach the vent 74, only the $CO_2$ gas vents through the membrane. As the bubble 66' shrinks due to venting, fresh fuel 54 is streamed into the chamber 60, staring the next pumping cycle. Additional details of this self-pumping anode may be found in, for example, U.S. Patent Application Publication No. 2012/0148931 which is incorporated by reference herein.

As explained in more detail below, chamber 60 is also defined, in part, by the cathode 56, which is situated opposite the anode 52 within the chamber 60. Still referring to FIG. 7, a description will be given of the portion of the fuel cell 50 that functions as the cathode 56. A $H_2O_2$ chamber 80 is located within the housing 58 and contains a liquid solution of $H_2O_2$ therein (e.g., oxidant chamber). The $H_2O_2$ solution may contain a solution of about 3% $H_2O_2$ in DI water although other concentrations may also be used within the fuel cell 50. The $H_2O_2$ chamber 80 is defined by a substrate 82 that functions as an $O_2$ capturing structure. The substrate 82 includes a plurality of through holes 84 passing entirely through the substrate 82. The substrate 82 may be formed from a silicon wafer or the like and be patterned as in the prior embodiment. A difference in this embodiment, however, is that the holes 84 pass entirely through the substrate 82. The substrate 82 thus has a first surface 86 that is exposed to the solution of $H_2O_2$. A second, opposing surface 88 of the substrate 82 is bonded directly or indirectly to a gas diffusion electrode 92. The gas diffusion electrode 92 is electrically conductive yet permeable to $O_2$ gas. Carbon paper may be used as the gas diffusion electrode 92, for example. While a spacer (not shown) may be used to connect the second surface 88 of the substrate 82 to the gas diffusion electrode 92, the gas diffusion electrode 92 may also be bonded directly to the second surface 88 using for example an adhesive.

In the embodiment of FIG. 7, the inner surface 94 of the holes 84 are coated with platinum black 96. In addition, the entire surface of the gas diffusion electrode 92 is coated with platinum black 96. The platinum black 96, as described above, is a catalyst and upon contact with $H_2O_2$ creates $O_2$ gas. In an alternative embodiment as described below with respect to FIG. 8A, the platinum black 96 may be omitted entirely from the inner surface 94 of the holes 84. In this case, the platinum black 96 only resides on a surface of the substrate facing the gas diffusion electrode 92 which is located away from the substrate by way of a spacer.

During operation of the fuel cell 50, when the $H_2O_2$ comes into contact with the platinum black 96, $O_2$ gas is created within the holes 84. The $O_2$ gas creates a bubble 98 that progressively grows within each hole 84. Growth of the bubble 98 stops when the solution of $H_2O_2$ is no longer in contact with the platinum black 96. The $O_2$ gas, however, is able to migrate through thee diffusion electrode 92 whereby it combines with hydrogen ions ($H^+$) and electrons to form $H_2O$. As $O_2$ gas is used up in this manner, the bubble 98 shrinks until the platinum black 96 is exposed again, whereby $O_2$ gas production resumes.

FIG. 8A illustrates another embodiment of a fuel cell 100. In this embodiment, the fuel cell 100 includes an anode 102 that contains a fuel 104. Like the embodiment of FIG. 7, the fuel cell 100 includes a self-regulating cathode 106. The fuel cell 100 includes a housing 108. The housing 108 contains the components of the fuel cell 100 including self-pumping anode 102 and the self-regulating cathode 106. The housing 108 may be made of a polymer such as polycarbonate or the like. The self-pumping anode 102 includes a chamber 110 or channel that contains the fuel 104 (e.g., fuel chamber). The self-pumping anode 102 and chamber 110 and associated components are similar to the embodiment illustrated in FIG. 7.

The chamber 110 of the fuel cell 100 includes an inlet 112 and an outlet 114. During the self-pumping process, fuel 104 enters the chamber 110 and is pumped in direction of arrow A using the self-generated bubbles 116 as described with respect to the embodiment of FIG. 7. Fuel 104 leaves the chamber 110 via the outlet 114. Fuel 104 may be recirculated as described with respect to the embodiment of FIG. 7 or, alternatively, the spent fuel 104 may be directed to a waste receptacle.

The chamber 110 is defined by the housing 108 and includes an anode 102 that is secured to one portion of the housing 108. The anode 102 is a graphite-based electrode (e.g., graphite plate) that is coated with palladium (Pd) black catalyst. The fuel 104 usable with the fuel cell 100 may be the same or similar to that of the prior embodiment. The mixed solution of fuel 104 and electrolyte starts a chemical reaction with the anode 102 whereby bubbles 116 of carbon dioxide ($CO_2$) are formed inside the chamber 110. As the bubbles 116 grow, they merge into a single large bubble 118 as described in the embodiment of FIG. 7. Further growth of the bubble 118 is blocked by a check valve 120 near the inlet 112 forcing the bubble 118 to propagate to in the direction of arrow A. Another check valve 122 is located downstream near to the outlet 114 to prevent gas from leaving. This process pushes the used fuel stream in the direction of arrow A and out the outlet 114. A vent 124, similar to that of the prior embodiment, is located in the housing 108 and is used to vent generated $CO_2$ out of the fuel cell 100.

As seen in FIG. 8A, chamber 110 is also defined, in part, by the cathode 106 which is situated opposite the anode 102 within the chamber 110. The cathode side of the fuel cell 100 includes a $H_2O_2$ chamber 126 (e.g., oxidant chamber) that is located within the housing 108 and contains a liquid solution of $H_2O_2$ therein as described previously. The $H_2O_2$ chamber 126 is defined by a substrate 128 that functions as an $O_2$ capturing structure. The substrate 128 includes a plurality of through holes 130 passing entirely through the substrate 128. The through holes 130 are hydrophilic and tend to wick the hydrogen peroxide catholyte to the platinum black catalyst as described below. The substrate 128 may have a thickness of around 500 μm thereby giving the holes 130 a depth of around 500 μm. The diameter of the holes 130 may be around 100 μm. Further, the holes 130 are circular in shape although other shapes may be used. It should be understood, however, that other dimensions for the depth and diameter may also be used. The substrate 128 may be formed from a silicon wafer or the like and be patterned as in the prior embodiments. The substrate 128 has a first surface 132 that is exposed to the solution of $H_2O_2$. A second, opposing surface 134 of the substrate 128 is bonded at its periphery to a spacer 136. The spacer 136 forms a gap 138 between the second surface 134 of the substrate 128 and the gas diffusion electrode 140. This gap 138 can be used to create a layer or blanket of $O_2$ gas 141 that is formed adjacent to a gas diffusion electrode 140 as seen in FIG. 8A. The spacer 136 may have a thickness on the order of around 1 mm. As in the prior embodiment, the gas diffusion electrode 140 is electrically conductive yet permeable to $O_2$ gas. Carbon paper with a cathode catalyst (i.e., platinum) may be used as the gas diffusion electrode 140. In the embodiment of FIG. 8A, the platinum black 142 catalyst is formed (through electroplating) on the second surface 134 of the substrate 128. In this embodiment, once the $O_2$ gas bubbles grow enough to displace the $H_2O_2$ from the second surface 134, oxygen generation stops until the layer of $O_2$ gas that is formed adjacent to the gas diffusion electrode 140 is used up. In the embodiment of FIG. 8A, any mixed potential issue is solved because the hydrogen peroxide decomposition (i.e., electrode giving process) and the oxygen reduction process (i.e., electron receiving) are occurring at their designated, separate locations. While the catalyst 142 is illustrated in FIG. 8A as being located on the second surface 134 of the substrate 128, the catalyst 142 may be located instead on the inner surface of the holes 130 or, alternatively, on both the inner surface of the holes 130 as well as the second surface 134 of the substrate 128.

Figure 8B:
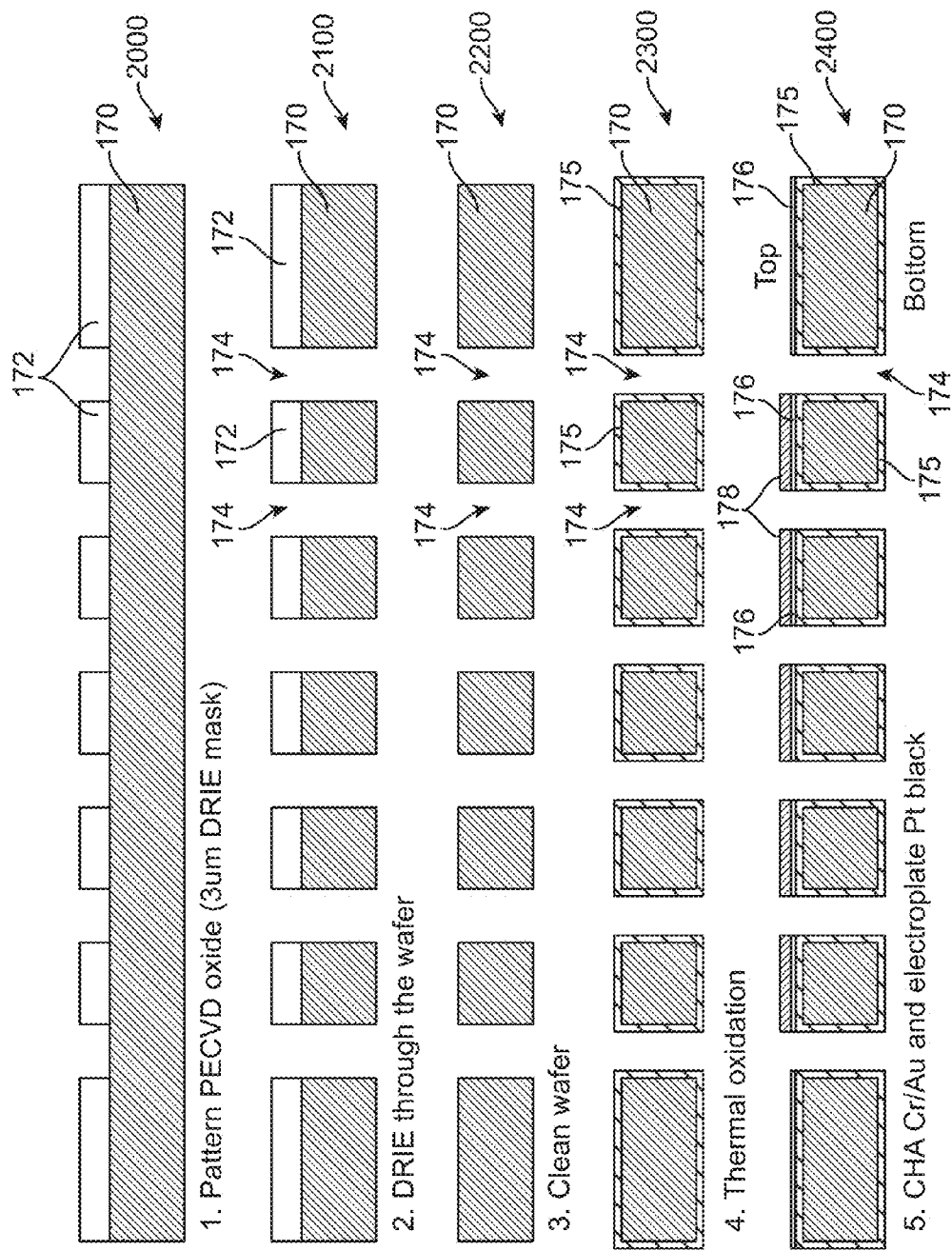
FIG. 8B illustrates a process of fabricating the device of FIG. 8A.

FIG. 8B illustrates a process of fabricating the oxygen generating structure used in the fuel cell 100 of FIG. 8A. The fabrication of oxygen-generation structure in the FIG. 8A embodiment has a simpler electroplating step because there is no need to deposit platinum black inside the wells. In the embodiment of FIG. 8B, platinum black is deposited on the topside of the structure, making the process much simpler and more reliable. With reference to operation 2000, a 4" silicon wafer 170 (500 μm thick), is patterned with a 3 μm silicon dioxide layer 172 using PECVD. As seen in operation 2100, arrays of 100 μm holes 174 with 200 μm pitch are created through the wafer 170 using DRIE. After through-hole etching by DRIE, the wafer 170 is thoroughly cleaned and thermally oxidized with oxide layer 175 as seen in operations 2200, 2300. The oxidation enables the through-holes 174 of the structure to wick the hydrogen peroxide through the holes 174 to the platinum black on the other side by its hydrophilic nature. With reference to operation 2400, after evaporating 20/200 nm Cr/Au seed layer 176, a high surface area of platinum black 178 is electroplated on a defined area at 1 A/cm$^2$ for 10 seconds for rigorous hydrogen peroxide decomposition. The plating solution was prepared by mixing 1 gram of chloroplatinic acid (Sigma Aldrich) into 100 mL of DI water and 30 μL of lead acetate (Sigma Aldrich).

Since the through holes 174 do not serve as a cathode anymore, the silicon wafer 170 does not need to be highly conductive anymore. Furthermore, in case of mass manufacturing, the structure made by operation 2300 in the process flow can be replaced with a porous glass slide, leaving only Cr/Au deposition and platinum black electrodeposition. In fuel cell 100 of FIG. 8A, once the gap 138 between the gas diffusion electrode 140 and the substrate 128 is filled with $O_2$ gas, the platinum black 142 catalyst is covered with gas and ceases to generate more oxygen until it is consumed to exposed the platinum black 142 catalyst to the hydrogen peroxide containing catholyte.

Figure 9:
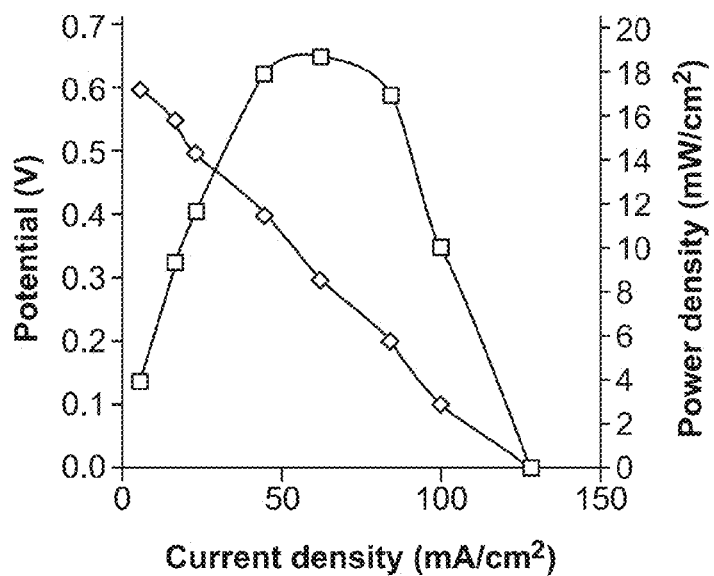
FIG. 9 illustrates the performance graph of the fuel cell of FIG. 8A.

FIG. 9 illustrates the performance graph of the fuel cell 100 of FIG. 8A, the measured current density at given potential load and the power density, which is the product of the current density and potential. The cell showed open circuit potential (OCP) of 0.6 V, which is similar or better than the previous case of air-breathing fuel cells meaning the mixed-potential issue in the cathode does not exist in the fuel cell embodiment 100. The performance graph shows 18.7 mW/cm$^2$ of power density, which is 57% better than the air-breathing case without active oxygen supply from self-regulating cathode using the same device to compare directly. The fuel cell embodiment 100 is operated with 1M formic acid in 1M sulfuric acid fuel and electrolyte mixture and 30% $H_2O_2$ in catholyte chamber.

Figure 10:
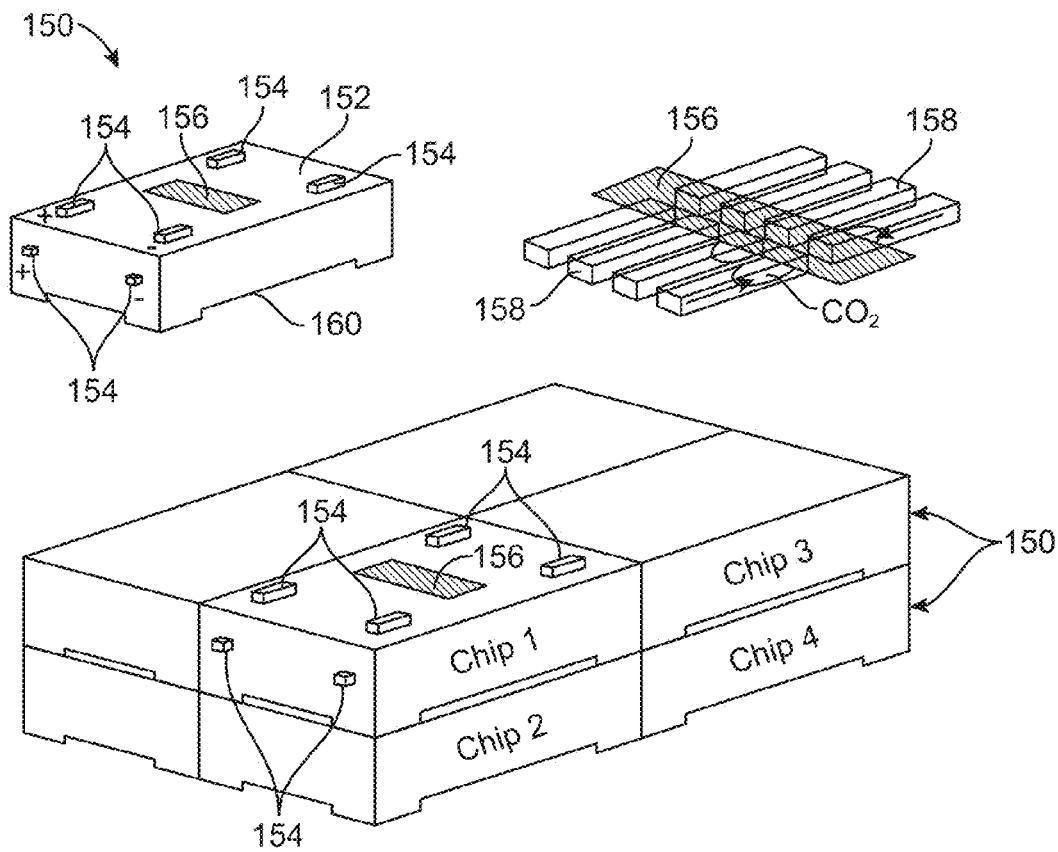
FIG. 10 illustrates another embodiment of a fuel cell and stacking of multiple fuel cells.

FIG. 10 illustrates another embodiment of a fuel cell 150. This embodiment illustrates the stackable nature of the fuel cells 150. Each fuel cell 150 is contained within a leak-proof outer housing 152. The housing 152 may be made out of a polymer material such as polycarbonate or acrylic plastic. Various electrical contacts 154 that connect to the anode/cathode of the fuel cell 150 are disposed on the outside of the fuel cell 150. These electrical contacts 154 enable multiple fuel cells 150 to be stacked together, adjacent to one another while ensuring electrical contacts between adjacent fuel cells 150. The fuel cells 150 may be connected in parallel, series, or some combination of the two. In the fuel cells 150 illustrated in FIG. 10, each individual fuel cell 150 has a common vent 156. The common vent 156 is a membrane or similar material that is permeable to gas (e.g., $CO_2$). In this embodiment, each fuel cell 150 includes a plurality of anode chambers 158 that are coupled to the common vent 156. In this regard, when $CO_2$ is produced and pumps fuel through the fuel side of the fuel cell 150, the $CO_2$ bubbles are then able to vent to the atmosphere. The anode chambers 158 may be constructed as chambers 60, 110 described herein. As seen in FIG. 10, each fuel cell 150 contains a recess 160 that is used to provide for passage of gas from the vent 156 when multiple fuel cells 150 are stacked on one another. Each fuel cell 150 contains a cartridge, reservoir, or chamber that holds, respectively, the fuel source as well as the $H_2O_2$.

The fuel cells described herein are environmentally friendly. The fuel cell architecture described herein has solved a long-standing problem of losing system-level energy density when fuel cells are miniaturized. The fuel cells function like batteries and last longer. The fuel cells are a standalone power source that runs on an inexpensive fuel like methanol or formic acid and an inexpensive oxidant (hydrogen peroxide). The fuel cells may also replace small batteries used in electronic devices and systems that demand miniature power sources. Fuel cells provide superior performance (e.g., longer life) and more flexible implantation schemes (e.g., cartridge replacement; stacking of fuel cells). Another advantage of fuel cells over batteries is that an instant power is ensured with no down time needed to charge batteries.

While embodiments have been shown and described, various modifications may be made without departing from the scope of the inventive concepts disclosed herein. The invention(s), therefore, should not be limited, except to the following claims, and their equivalents.

What is claimed is:

1. A fuel cell comprising:
   a housing containing a fuel chamber and an oxidant chamber;
   an anode disposed in the housing and exposed to the fuel chamber;
   a cathode comprising a gas diffusion electrode interposed between the fuel chamber and the oxidant chamber, the gas diffusion electrode having a catalyst layer formed thereon and exposed to the fuel chamber; and
   a gas capturing substrate disposed in the oxidant chamber and spaced apart from the gas diffusion electrode, the gas capturing substrate having first and second sides containing a plurality of holes extending between the first and second sides, the first side facing an oxidant contained in the oxidant chamber and the second side facing the gas diffusion electrode, the gas capturing substrate containing a catalyst on at least one of the second side of the substrate or an inner surface of the plurality of holes.

2. The fuel cell of claim 1, wherein the fuel source comprises methanol, formic acid, or hydrogen peroxide.

3. The fuel cell of claim 1, wherein the fuel chamber communicates with a gas vent.

4. The fuel cell of claim 1, wherein the anode is configured to generate bubbles within the fuel chamber.

5. The fuel cell of claim 1, wherein a spacer separates the gas capturing substrate from the gas diffusion electrode.

6. A system of stacked fuel cells comprising a plurality of fuel cells of claim 1, wherein adjacent fuel cells of the stack are interconnected via external electrical contacts.

7. A fuel cell comprising:
   a housing containing at least one fuel chamber and at least one oxidant chamber;
   a fuel source disposed in the at least one fuel chamber;
   wherein the at least one oxidant chamber comprises a gas capturing substrate disposed in the housing and having a first side facing an oxidant and a second side secured to a spacer to define a gap between the gas capturing substrate and a gas diffusion electrode, the gas diffusion electrode having a catalyst layer formed thereon and exposed to the fuel source of the at least one fuel chamber, wherein the gas capturing substrate contains a plurality of holes or wells contained therein; and
   a catalyst layer formed within or adjacent to the plurality of holes or wells.

8. The fuel cell of claim 7, wherein an anode is disposed in the at least one fuel chamber and is configured to generate gas bubbles upon exposure to the fuel source.

9. The fuel cell of claim 8, further comprises a gas vent disposed in the housing and configured to vent bubbles from the at least one fuel chamber.

10. The fuel cell of claim 7, further comprising electrical contacts disposed on an external surface of the housing.

11. A system of stacked fuel cells comprising a plurality of fuel cells of claim 7, wherein adjacent fuel cells of the stack are interconnected via external electrical contacts.

12. The fuel cell of claim 7, wherein the fuel source comprises methanol, formic acid, or hydrogen peroxide.

13. The fuel cell of claim 7, wherein the spacer has a thickness of around 1 mm.

* * * * *